(12) United States Patent
Sanderson et al.

(10) Patent No.: US 11,682,075 B2
(45) Date of Patent: *Jun. 20, 2023

(54) SYSTEMS AND METHODS FOR PROCESSING ITEMS IN A QUEUE

(71) Applicant: Capital One Services, LLC, McLean, VA (US)

(72) Inventors: Drake R. Sanderson, Flower Mound, TX (US); Thomas Busath, McKinney, TX (US); Sarita Ayyalasomayajula, Frisco, TX (US); Taylor Geron, Plano, TX (US); Jaiden Gerig, Seattle, WA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/725,278

(22) Filed: Apr. 20, 2022

(65) Prior Publication Data
US 2022/0261890 A1  Aug. 18, 2022

Related U.S. Application Data

(63) Continuation of application No. 16/734,782, filed on Jan. 6, 2020, now Pat. No. 11,341,570.

(51) Int. Cl.
*G06Q 40/00* (2023.01)
*G06Q 40/03* (2023.01)
(Continued)

(52) U.S. Cl.
CPC ........... *G06Q 40/03* (2023.01); *G06F 9/4881* (2013.01); *G06F 9/546* (2013.01); *G06N 20/00* (2019.01)

(58) Field of Classification Search
CPC .... G06Q 40/025; G06F 17/5009; G06F 17/18
See application file for complete search history.

(56) References Cited

U.S. PATENT DOCUMENTS

2002/0024537 A1   2/2002   Jones et al.
2003/0107575 A1   6/2003   Cardno
(Continued)

OTHER PUBLICATIONS

Natekin, Alexey (Gradient boosting machines, a tutorial, https://www.frontiersin.org/articles/10.3389/fnbot.2013.00021/full, Dec. 4, 2013) (Year: 2013).*

*Primary Examiner* — Bruce Ebersman
*Assistant Examiner* — Mark H Gaw
(74) *Attorney, Agent, or Firm* — Hunton Andrews Kurth LLP

(57) ABSTRACT

Systems and methods for processing items in a queue, a system including one or more memory devices storing instructions and one or more processors configured to execute the instructions to perform operations including: analyzing training data to build a predictive model; applying the predictive model to items in a queue to determine scores of the items based on respective probabilities of an entity completing an action for each item; listing the items, sorted by the scores, in a first display view; identifying a first and a second item, respectively having highest and next highest scores; grouping, with each of the first and second items, items that satisfy a grouping condition based on characteristic information of the items; and listing the groups of items including the first and second items, sorted based on the scores of the first and second items, in a second display view.

20 Claims, 5 Drawing Sheets

(51) Int. Cl.
*G06N 20/00* (2019.01)
*G06F 9/54* (2006.01)
*G06F 9/48* (2006.01)

(56) References Cited

U.S. PATENT DOCUMENTS

| | | |
|---|---|---|
| 2004/0215547 A1 | 10/2004 | Nazari et al. |
| 2008/0102868 A1* | 5/2008 | Nagatomo ........ H04M 1/72439 455/466 |
| 2008/0140555 A1* | 6/2008 | Tai .................... G06Q 40/03 726/21 |
| 2012/0323760 A1* | 12/2012 | Lee .................... G06Q 40/02 705/38 |
| 2018/0075175 A1* | 3/2018 | Chang ................ G06F 17/18 |

* cited by examiner

SYSTEMS AND METHODS FOR PROCESSING ITEMS IN A QUEUE

CROSS-REFERENCE TO RELATED APPLICATION

This application is a continuation of U.S. patent application Ser. No. 16/734,782 filed Jan. 6, 2020, titled "SYSTEMS AND METHODS FOR PROCESSING ITEMS IN A QUEUE," that further relates to U.S. patent application Ser. No. 16/660,751, filed Oct. 22, 2019, titled "SYSTEMS AND METHODS FOR INTELLIGENTLY OPTIMIZING A QUEUE OF ACTIONS IN AN INTERFACE USING MACHINE LEARNING," the disclosures of which are expressly incorporated herein by reference in their entirety.

TECHNICAL FIELD

The present disclosure generally relates to data processing systems, and more particularly, to systems and methods for processing items in a queue.

BACKGROUND

Consumers often seek financing from institutions to finance certain types of purchases, including, for example, automobile purchases. Automobile dealerships may act as loan-arranging entities that help arrange the financing, and they typically send loan applications to multiple financial institutions (e.g., prospective lenders), who may competitively bid to fund the loan applications. Relationship managers or loan officers working for the financial entities may evaluate the loan applications and seek to originate the loans on terms that are acceptable to the financial entities, the dealers, and the consumers.

A relationship manager may contact the dealerships regarding the loan applications assigned to the relationship manager to help improve a likelihood that the loan applications will be funded through the financial entity for which the relationship manager works. Existing tools for assisting the relationship manager have deficiencies, such as lacking the ability to prioritize the loan applications for review by the relationship manager. Due to a high volume of loan applications pending review, the relationship manager may not be able to evaluate all applications manually and therefore relies solely on his or her experience when prioritizing and evaluating the loan applications.

SUMMARY

In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

The disclosed embodiments include a system for processing items in a queue. In some embodiments, the system includes one or more memory devices storing instructions and one or more processors. The one or more processors are configured to execute the instructions to perform operations including: analyzing training data to build a predictive model; applying the predictive model to a plurality of items in a queue of items to determine scores of the plurality of items based on respective probabilities of an entity completing an action for each of the plurality of items; listing the plurality of items, sorted by the scores, in a first display view to a user through a user interface; identifying a first and a second item, of the plurality of items, respectively having highest and next highest scores; grouping, with each of the first and second items, other ones of the plurality of items that satisfy a grouping condition based on characteristic information of the plurality of items; and listing the groups of items including the first and second items, sorted based on the scores of the first and second items, in a second display view to the user through the user interface.

The disclosed embodiments also include a method for processing items in a queue. In some embodiments, the method includes receiving characteristic information of a plurality of items; applying a predictive model to the plurality of items to determine scores of the plurality of items based on respective probabilities of an entity completing an action for each of the plurality of items; listing the plurality of items, sorted by the scores, in a first display view to a user through a user interface; identifying a first and a second item, of the plurality of items, respectively having highest and next highest scores; grouping, with each of the first and second items, other ones of the plurality of items that satisfy a grouping condition based on characteristic information of the plurality of items; and listing the groups of items including the first and second items, sorted based on the scores of the first and second items, in a second display view to the user through the user interface.

The disclosed embodiments further include a non-transitory computer-readable medium, storing instructions that are executable by one or more processors to perform operations. The operations include: determining scores of a plurality of items based on respective probabilities of an entity completing an action for each of the plurality of items; listing the plurality of items, sorted by the scores, in a first display view to a user through a user interface; identifying a first and a second item of the plurality of items respectively having highest and next highest scores; grouping, with each of the first and second items, other ones of the plurality of items that satisfy a grouping condition based on characteristic information of the plurality of items; and listing the groups of items including the first and second items, sorted based on the scores of the first and second items, in a second display view to the user through the user interface.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate exemplary disclosed embodiments and, together with the description, serve to explain the disclosed embodiments. In the drawings:

FIG. 4 is a schematic diagram illustrating an exemplary user interface in a first display view, consistent with some embodiments of the present disclosure.

FIG. 5 is a schematic diagram illustrating an exemplary user interface in a second display view, consistent with some embodiments of the present disclosure.

DETAILED DESCRIPTION

An employee working in an entity may utilize a tool or a platform to assist reviewing and tracking status or pending action items of multiple ongoing projects or cases. For example, a relationship manager of a financial entity may be assigned to handle multiple loan applications that need to be reviewed and processed. Sometimes the relationship manager may need to negotiate with loan arranging entities that submitted the loan applications.

Existing tools lack the ability to help the relationship manager prioritize actions or loan applications, and the relationship manager relies on his or her experience to decide which loan applications to work on. Since experience and behavior vary from person to person, the current workflow cannot optimize the likelihood of winning the bid to fund loan applications.

In some embodiments of the present disclosure, improved systems and methods for processing items in a queue use machine learning to rank the items and list the items in different ways based on one or more characteristics of the items to overcome problems stated above. For example, the improved systems and methods may use machine learning to predict the probability and/or profitability of loan applications and provide a friendly user interface with different views for the relationship manager to facilitate engaging with different loan arranging entities to negotiate the loan applications. The following disclosure provides exemplary systems and methods for processing items in a queue for realizing at least some of the above advantages and benefits over conventional systems.

Reference will now be made to exemplary embodiments, examples of which are illustrated in the accompanying drawings and disclosed herein. Wherever convenient, the same reference numbers will be used throughout the drawings to refer to the same or like parts.

Figure 1:
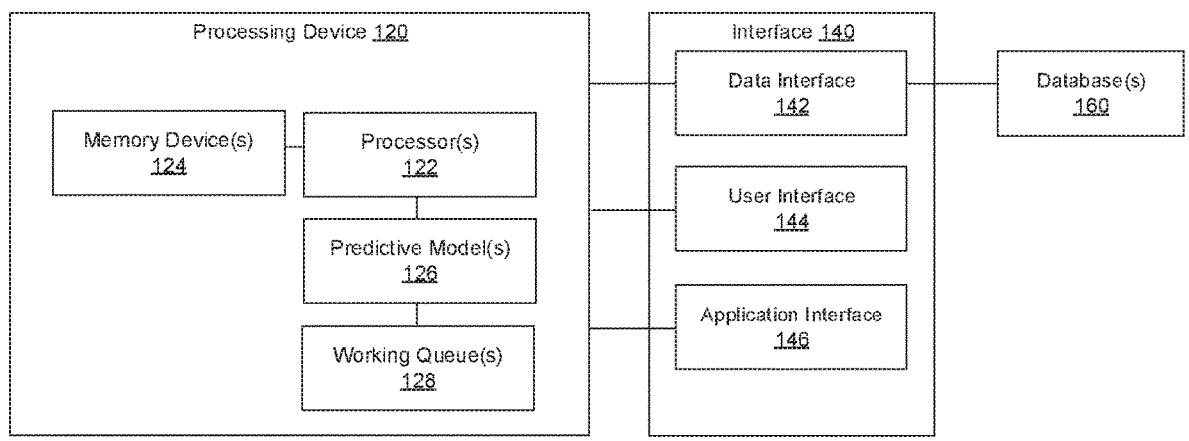
FIG. 1 is a schematic diagram illustrating an exemplary system for processing items in a queue, consistent with some embodiments of the present disclosure.

FIG. 1 is a schematic diagram illustrating an exemplary system 100 for processing items in a queue, consistent with some embodiments of the present disclosure. System 100 may be an intelligent interface queuing system and include a processing device 120, an interface 140, and one or more databases 160. Processing device 120 can include one or more processors 122 and one or more memory devices 124. Processing device 120 may also store one or more predictive models 126 and one or more working queues 128.

In some embodiments, processor 122 may be implemented by application-specific integrated circuits (ASICs), field-programmable gate arrays (FPGAs), or various other types of processors. For example, processor 122 can be one or more central processors or microprocessors.

Memory device(s) 124 can be various computer-readable media implemented in any method or technology for storage of information such as computer-readable instructions, data structures, program modules or other data. Memory device(s) 124 can include non-volatile media and/or volatile media, such as read only memory (ROM) and random-access memory (RAM), and be communicatively coupled with processor 122. A basic input/output system (BIOS) containing the basic routines that help to transfer information between elements within system 100 is typically stored in ROM. Additionally, RAM may contain operating system (OS), applications, other programmable code, and programs. The RAM typically contains data and/or program modules that are immediately accessible to and/or presently being operated on by processor 122.

In some embodiments, memory device(s) 124 may include a main memory, which can be used for storing temporary variables or other intermediate information during execution of instructions by processor 122. Such instructions, after being stored in non-transitory storage media accessible to processor 122, render system 100 into a special-purpose machine that is customized to perform operations specified in the instructions. The term "non-transitory media" as used herein refers to any non-transitory media storing data or instructions that cause a machine to operate in a specific fashion. Such non-transitory media include, for example, optical or magnetic disks, dynamic memory, a floppy disk, a flexible disk, hard disk, solid state drive, magnetic cassettes, magnetic tape, or any other magnetic data storage medium, a CD-ROM, digital versatile disks (DVD) or any other optical data storage medium, any physical medium with patterns of holes, a Random Access Memory (RAM), a read-only memory (ROM), a Programmable Read-Only Memory (PROM), a EPROM, a FLASH-EPROM, NVRAM, flash memory, or other memory technology and/or any other storage medium with the same functionality that can be contemplated by persons of ordinary skill in the art to which this disclosure pertains.

In some embodiments, predictive model(s) 126 and working queue(s) 128 can be stored in memory device(s) 124 or other storage device(s), such as a hard disk or solid-state drive, in system 100. In some embodiments, predictive model(s) 126 and working queue(s) 128 may be stored in an external storage device in communication with system 100 via a network or interface 140. For example, predictive model(s) 126 and working queue(s) 128 may also be stored in database(s) 160.

Interface 140 can include one or more interfaces, such as a data interface 142, a user interface 144, and an application interface 146, to interact with database(s) 160, users, and other computing systems via wired or wireless communication. As shown in FIG. 1, database(s) 160 is communicatively coupled to processing device 120 through data interface 142 in interface 140. User interface 144 may be, for example, a website, a web-based application, a mobile application, a desktop application, and/or other software, running on a personal computer, smartphone, tablet, kiosk system, or other electronic device communicatively coupled to processing device 120, which provides a graphic user interface to interact with users to input commands and display information. Application interface 146 may be any hardware or software interface communicatively coupled to processing device 120 and configured to connect processing device 120 with other applications.

Figure 2:
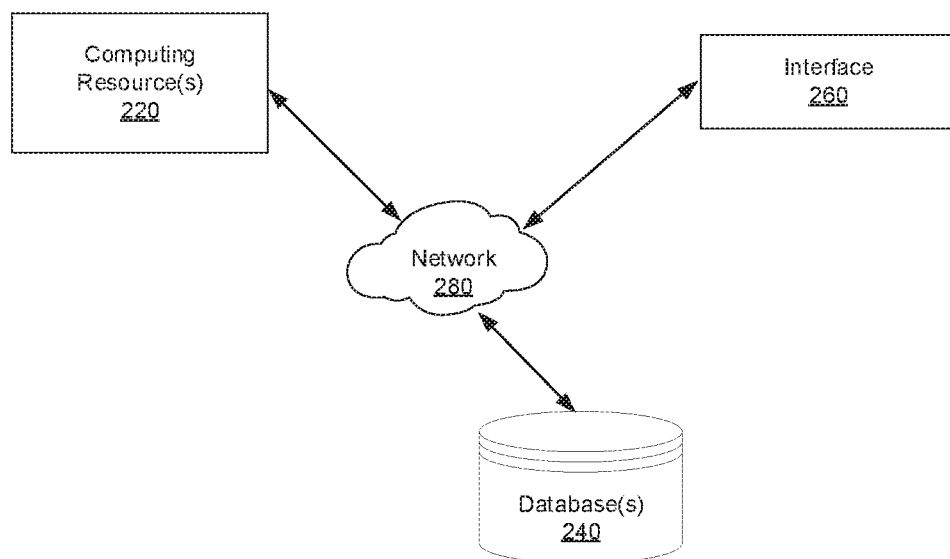
FIG. 2 is a schematic diagram illustrating an exemplary cloud-computing system, consistent with some embodiments of the present disclosure.

In some embodiments, system 100 may operate as a part of a cloud-computing system. FIG. 2 is a schematic diagram illustrating an exemplary cloud-computing system 200, consistent with some embodiments of the present disclosure. Cloud-computing system 200 includes one or more computing resources 220, one or more databases 240, an interface 260, a network 280, and the like. In some embodiments, cloud-computing system 200 may provide a Software as a Service (SaaS) platform to execute one or more applications to perform a method for process items in a queue.

In some embodiments, components in cloud-computing system 200 can be used to implement system 100 for processing items in a queue. For example, computing resource(s) 220 may include one or more processing devices 120 and corresponding processor(s) 122, memory device(s) 124, predictive model(s) 126, and working queue(s) 128.

Database 240 can be configured to store database(s) 160 as sub database(s). Interface 260 and network 280 can utilize data interface 142, user interface 144, and application interface 146 by exchanging data or instructions between cloud-computing system 200 and other systems.

Computing resources 220 can include one or more computing devices configurable to train data models. For example, computing resources 220 may include one or more processing devices 120 and corresponding processor(s) 122, memory device(s) 124, predictive model(s) 126, and working queue(s) 128 shown in FIG. 1. The computing devices can be special-purpose computing devices, such as graphical processing units (GPUs), ASICs, or general-purpose computing devices. The computing devices can be configured to host an environment for training data models. For example, the computing devices can host virtual machines, pods, or containers. The computing devices can be configured to run applications for generating data models. For example, the computing devices can be configured to run Amazon Web Services (AWS) SageMaker, Tensorflow, or similar machine-learning training applications. Computing resources 220 can be configured to receive models for training from model optimizers, model storage devices, or other components of cloud-computing system 200. Computing resources 220 can be configured to provide training results, including trained models and model information, such as the type and/or purpose of the model and any measures of classification error.

Database 240 can include one or more databases configured to store data for use by cloud-computing system 200. For example, database 240 may store training data for machine learning or neural network training. The databases can include cloud-based databases (e.g., AMAZON WEB SERVICES S3 buckets) or on-premises databases.

Interface 260 can be configured to provide communications with other systems and to manage interactions between cloud-computing system 200 and other systems using network 280. In some aspects, interface 260 can be configured to publish data received from other components of cloud-computing system 200 (e.g., computing resources 220, database 240, or the like). This data can be published in a publication and subscription framework (e.g., using APACHE KAFKA), through a network socket, in response to queries from other systems, or using other known methods. In various aspects, interface 260 can be configured to provide data or instructions received from other systems to components of cloud-computing system 200. For example, interface 260 can be configured to receive instructions for generating data models (e.g., type of data model, data model parameters, training data indicators, training parameters, or the like) from another system and provide this information to computing resources 220. As an additional example, interface 260 can be configured to receive data including sensitive portions from another system (e.g. in a file, a message in a publication and subscription framework, a network socket, or the like) and provide that data to database 240.

Network 280 provides communication between components (e.g., computing resource(s) 220, database(s) 240, and interface 260) of cloud-computing system 200. Accordingly, components of cloud-computing system 200 can be configured to communicate with each other, or with external components of system 200. Network 280 can include any combination of electronics communications networks enabling communication between components of cloud-computing system 200. For example, network 280 may include the Internet and/or any type of wide area network, an intranet, a metropolitan area network, a local area network (LAN), a wireless network, a cellular communications network, a Bluetooth network, a radio network, a device bus, or any other type of electronics communications network know to one of skill in the art.

The arrangement of components depicted in FIG. 2 is merely an example and not intend to limit the present disclosure. In various embodiments of the present disclosure, cloud-computing system 200 can include additional components, or fewer components. Multiple components of cloud-computing system 200 can be implemented using the same physical computing device or different physical computing devices. It should be appreciated that cloud-computing system 200 is depicted merely as an example for implementing a cloud-computing system.

As mentioned above, components in cloud-computing system 200 can be used to implement system 100 to carry out various operations disclosed herein. Particularly, the operations may be performed by one or more processor 122 in computing resource(s) 220 of cloud-computing system 200. For illustrative purposes, the description below may reference processor 122 and system 100 as the system configured to carry out various operations. It should be appreciated, however, that the references to processor 122 and system 100 are merely provided as examples and are not meant to limit the present disclosure.

Referring to FIG. 1 again, in some embodiments, processor 122 can be configured to execute a set of instructions stored in memory device(s) 124 to cause system 100 to perform operations for processing items in a queue. Processor 122 can analyze a set of training data to build predictive model 126 using one or more machine learning algorithms. Predictive model 126 may be applied to determine a score indicating a likelihood for completing a task or an action between two parties for an item.

Particularly, in some embodiments, processor 122 may utilize predictive model 126 to analyze historical data to identify the likelihood for completing the task or the action to determine the score, which can be used to prioritize the items and tasks for an entity.

In some embodiments, processor 122 may also utilize predictive model 126 to consider or learn several factors relevant to the completion of the task or action. For example, in some embodiments, predictive model 126 may take into account the interactions between two parties, e.g., a first party and a second party, to determine the score. In some embodiments, predictive model 126 may also take into account whether the first party proactively or reactively engaged with the second party to determine the score.

In some embodiments, the items may be loan applications involving tasks or actions between two parties. For example, the first party may include a relationship manager working for a financial entity, the second party may include one or more entities arranging the loan applications (e.g., dealerships), and the tasks or actions may include one or more loan applications pending review by the relationship manager. The loan applications can be, but are not limited to, automobile loan applications for financing the purchases of cars, trucks, or other automotive vehicles. It is noted that term "financial entity" is used herein in its broadest sense and is intended to encompass all such possibilities including, but not limited to, banks, credit card company or credit unions, financial institutions, finance companies, stock brokerages, savings and loans, mortgage companies, insurance companies, or any other type of financial service entity. Institutions, organizations, or even individuals may be varied in their organization and structure.

Processor 122 may apply predictive model 126 to these loan applications to determine the scores of these loan applications to the financial entity and prioritize these loan applications accordingly. Processor 122 may therefore provide the abilities to analyze historical data and prioritize future tasks, both of which cannot not be done by the relationship manager manually or mentally due to the high volume of loan applications and because most of the historical data is recorded in a manner not readily understandable by the relationship manager. Furthermore, the relationship manager does not have the mental capacity to keep track of all interactions between the relationship manager and the various dealerships, let alone analyzing these interactions to identify factors relevant to the completion of the loan applications. Processor 122 can thus be utilized to improve the way the relationship managers manage and prioritize the loan applications pending their review.

In some embodiments, scores of the loan applications may be determined by taking into consideration the probabilities of the financial entity funding the loan applications. In some embodiments, predictive model 126 may predict the probabilities of the financial entity funding the loan applications both for situations in which the financial entity, through actions by the relationship manager, (1) proactively engages the loan arranging entities (e.g., the dealerships) to negotiate the terms and (2) reactively engages the loan arranging entities to negotiate the terms. In this manner, processor 122 may utilize predictive model 126 to determine whether proactively engaging the loan arranging entities can positively affect the financial entity's likelihood of winning the bid to fund the loan applications.

In some embodiments, processor 122 may rank prediction results and store working queue(s) 128 for one or more relationship managers based on the scores of the items. By reporting and presenting the prediction results to the relationship manager(s), system 100 can help the relationship manager(s) decide whether to proactively engage with the corresponding loan arranging entity for any of the loan applications, having pending actions, in the respective working queue(s). For example, processor 122 may present the loan applications according to a ranking order, based on working queue(s) 128, to the relationship managers through user interface 144. In addition, in different display views, the ranking order presented in user interface 144 may be different to facilitate engagements with different loan arranging entities.

In some embodiments, processor 122 may build predictive model 126 as a gradient boosting machine (GBM) model. Gradient boosting is a machine-learning technique for regression and classification. In some embodiments, the gradient boosting machine is configured to produce predictive model 126 as an ensemble of predictive models, such as decision trees, which can be utilized to predict the probabilities of the financial entity funding a loan application both with and without proactive engagement of a relationship manager working for the financial entity.

It is contemplated that, while the GBM model is used as an example herein, processor 122 may build predictive model 126 using other machine-learning techniques without departing from the spirit and scope of the present disclosure. For example, processor 122 may build predictive model 126 using logistic regression, naive Bayes, neural networks (e.g., multilayer perceptron, back-propagation, and other deep architectures), support vector machines, random forests, as well as other boosting algorithms or binary classification algorithms that can be adapted to output probabilities.

It is also to be understood that processor 122 may be configured to build more than one predictive model 126 depending on the needs of the financial entity utilizing system 100. For example, for a small financial entity having only a few relationship managers, processor 122 can be configured to build just one predictive model 126 to collectively process all loan applications, having pending actions, by the financial entity. On the other hand, for a large financial entity having different lending units for processing different types of loans, processor 122 can be configured to build one or more predictive models 126 for the respective lending units. Alternatively, or additionally, processor 122 can be configured to build one predictive model 126 for each relationship manager. Likewise, in some embodiments, processor 122 can also be configured to build different predictive models 126 for different dealerships with which the financial entity conducts business, or for different geographic regions or other types of clusters (e.g., clusters based on credit profiles such as prime, near prime, subprime, etc.), without departing from the spirit and scope of the present disclosure.

In some embodiments, processor 122 may specify a dependent variable of predictive model 126 to represent an outcome of the loan applications. For example, in some embodiments, the outcome may indicate whether a loan application has reached the status of "funded" or "not funded" within a specified time period (e.g., 30 days) from an application submission date. In some embodiments, unfunded loan applications may expire after the time period has lapsed after their respective submission dates.

Processor 122 can build predictive model 126 using training data containing historical loan applications. The historical loan applications may include applications that have either been funded by the financial entity or have expired or rejected without being funded by the financial entity. In some embodiments, processor 122 may retrieve the historical loan applications from database(s) 160 maintained by the financial entity. In some embodiments, database(s) 160 records historical loan applications submitted to the financial entity along with their corresponding status updates. For example, when the relationship manager at the financial entity or a salesperson (e.g., a sales associate) at the dealership works on a corresponding loan application recorded in database 160, records stored in database(s) 160 can be updated accordingly.

In some embodiments, processor 122 may also specify different categories of descriptive attributes of historical loan applications for predictive model 126 in order to identify characteristics that are relevant to the outcomes of the historical loan applications (e.g., funded or not funded). One of the categories may include, for example, applicant's credit information, such as a FICO® score, a credit rating, or the like. Other categories may include, for example, deal structure (e.g., loan amount, down payment, annual percentage rate, etc.), line of credit information (including, e.g., whether the applicant has a business line of credit through the financial entity), approval status (including, e.g., whether the loan is approved with any conditions or the like), dealer information (including, e.g., service levels, dealer credit, etc.), and dynamic features that may change over time (including, e.g., age of the loan application, level of dealer engagement, etc.). It is contemplated that additional or alternative features that can capture the dealer relationship, deal structure, and credit information, may also be specified without departing from the spirit and scope of the present disclosure.

In some embodiments, processor 122 may further specify a category of descriptive attribute referred to as "engagement information." Engagement information for a loan application may indicate, for example, whether or not a relationship manager engaged the dealership (or more generally, the loan-arranging entity) to work on the loan application. In some embodiments, the engagement information may be recorded in database 160 and processor 122 may retrieve the engagement information from database 160 to form a part of the training data.

In some embodiments, the engagement information for a loan application may further include data regarding whether a relationship manager proactively or reactively engaged the dealership (or more generally, the loan arranging entity) to work on the loan application. Processor 122 may, for example, request the relationship managers to indicate whether they proactively or reactively engaged the loan arranging entities to work on loan applications by providing corresponding messages via user interface 144. The relationship managers may provide or update the engagement information via user interface 144, and processor 122 may record the received engagement information in database 160 accordingly.

It is contemplated that knowing whether a relationship manager proactively or reactively engaged a dealership to work on a loan application may further improve the accuracy of predictive model 126. Generally, if a dealership contacts a relationship manager to solicit assistance during the underwriting and funding process (in other words, the relationship manager "reactively" engages the dealership to work on the loan application), the relationship manager may have a greater chance of winning the bid for the financial entity to fund the loan application. On the other hand, more effort may be required of the relationship manager if the relationship manager "proactively" engages the dealership to work on the loan application. This is because the dealership may have already started working with another institution to fund the loan, in which case the dealership may only consider the relationship manager's bid if the bid is more attractive compared to that offered by the other institution. It is also possible that the loan has already been funded by the other institution, in which case proactively engaging the dealership to work on the loan application will not be worthwhile for the relationship manager. Therefore, knowing whether the relationship manager proactively or reactively engaged dealerships to work on loan applications may improve the accuracy of predictive model 126. And in some embodiments, processor 122 may build predictive model 126 using training data that contains engagement information for the historical loan applications.

In some embodiments, processor 122 may organize the training data as a set of "snapshots." For example, in some embodiments, processor 122 may organize the training data as a set of ten snapshots. Each snapshot may include historical loan applications previously pending in a working queue of a relationship manager. Furthermore, in some embodiments, each snapshot may specify a time window, and only historical loan applications pending within the time window may be included in that snapshot. For example, the time window may be specified as a seven-day window. In this manner, the training data may include a snapshot containing historical loan applications pending in the working queue of the relationship manager within the last seven days. The snapshot may also contain information regarding the various categories of descriptive attributes associated with the historical loan applications. Such descriptive attributes may include, e.g., applicant's credit information, deal structure, line of credit information, approval status, dealer information, as well as dynamic features, as described above.

In some embodiments, processor 122 may create snapshots according to a predetermined interval. For example, in some embodiments, processor 122 may create a snapshot every three days (with each snapshot covering a seven-day window) so that there is an overlap of loan applications between two adjacent snapshots. This overlap may provide continuity that allows predictive model 126 to analyze loan applications as they progress through the approval process, which may in turn help improve the accuracy of predictive model 126. In some embodiments, processor 122 may discard older snapshots and keep only a predetermined number of snapshots in the training data. In some embodiment, processor 122 may keep ten snapshots in the training data. It is to be understood, however, that processor 122 may keep a different number of snapshots without departing from the spirit and scope of the present disclosure.

Additionally, in some embodiments, processor 122 may select to include only matured loan applications in the training data. Matured loan applications may include applications that have either been funded by the relationship manager's financial entity or have expired or been rejected without being funded by the financial entity. In some embodiments, processor 122 may exclude loan applications that have been cancelled.

In some embodiments, processor 122 may filter the training data to only include loan applications that are consistent with the relationship manager's lines of business. For example, if the relationship manager only works with certain types of loan applications (e.g., truck loan applications), processor 122 may select to include only those types of loan applications in the training data. It is contemplated that filtering training data in this manner may help tailor predictive model 126 for a particular relationship manager, which may in turn help improve the accuracy of predictive model 126 for that particular relationship manager.

Once processor 122 finishes building predictive model 126, processor 122 may utilize predictive model 126 to determine the score of each loan application. In some embodiments, the score may be determined based on a difference between the probability of the financial entity funding a new loan application if the financial entity proactively engages the loan arranging entity of the loan application and the probability of the financial entity funding the loan application if the financial entity reactively engages the loan arranging entity. The score can thus be used to indicate whether it is worthwhile for the relationship manager to proactively engage with the loan arranging entity.

Generally, a greater score suggests that proactively engaging the dealership will produce a greater impact on the probability of the financial entity funding the loan application. It is to be understood that processor 122 may continue to train predictive model 126 on an ongoing basis as new records are stored in database 160.

In some embodiments, processor 122 may apply additional mathematical operations to calculate the score for each loan application, so that the score can be further used to indicate a financial value for the loan application. For example, in some embodiments, processor 122 may multiply original scores (e.g., the scores calculated based on the probabilities of funding new loan applications) by appropriate scalars. In some embodiments, processor 122 may determine the scalars based on the type of the loan applications. For example, personal loans and commercial loans may be assigned different scalars by the financial entity. Alternatively, or additionally, loans for different dollar amounts may be assigned different scalars.

In some embodiments, processor 122 may also consider the expected profitability of the loans and scale the financial values of the loan applications accordingly. This "profitability scalar" may be used to increase the financial value of a loan that would otherwise garner a lower financial value or vice versa. For example, in some embodiments, processor 122 may score a highly profitable loan with a higher financial value compared to a loan that has a lower profitability, even if predictive model 126 suggests that the highly profitable loan is less likely to be funded compared to the loan that has the lower profitability.

In some embodiments, processor 122 may further adjust the financial values of the loan applications based on certain characteristics of the loan applications. For example, if the relationship manager has several loan applications from the same dealership, processor 122 may recognize these loan applications as a group and increase the financial values of this group of loan applications. For example, processor 122 may increase the financial values for a group of loan applications because the relationship manager may be able to handle this group of loan applications more efficiently (e.g., with a single phone call to the dealership rather than multiple phone calls to multiple dealerships). It is contemplated that the adjustments discussed above are merely examples and not meant to limit the scope of the present disclosure. Processor 122 may increase or decrease the financial values of the loan applications based on other characteristics of the loan applications without departing from the spirit and scope of the present disclosure.

Processor 122 may further apply time factor adjustments to calculate the scores. For example, in some embodiments, processor 122 may divide the financial value calculated for each loan application by an average working time required to work on loan applications of the same type. In this manner, processor 122 may be able to calculate and finalize the score that can represent the financial value of the loan application per unit of time. Thus, based on the finalized score, it can be determined which loan applications can benefit the most from the relationship manager's proactive engagement per unit of time.

In some embodiments, processor 122 may calculate and report the score for each loan application to the relationship manager through user interface 144. The relationship manager may interact with user interface 144 to rank the loan applications based on their corresponding scores in different display view. For example, in a default view, the loan applications may be listed in user interface 144 in a descending order based on the scores. On the other hand, in a linked view, two or more loan applications can be grouped if a grouping condition is satisfied and listed in user interface 144 together. In this manner, the relationship manager may determine which loan applications can benefit the most from the relationship manager's proactive engagement based on the predicted scores.

Figure 3:
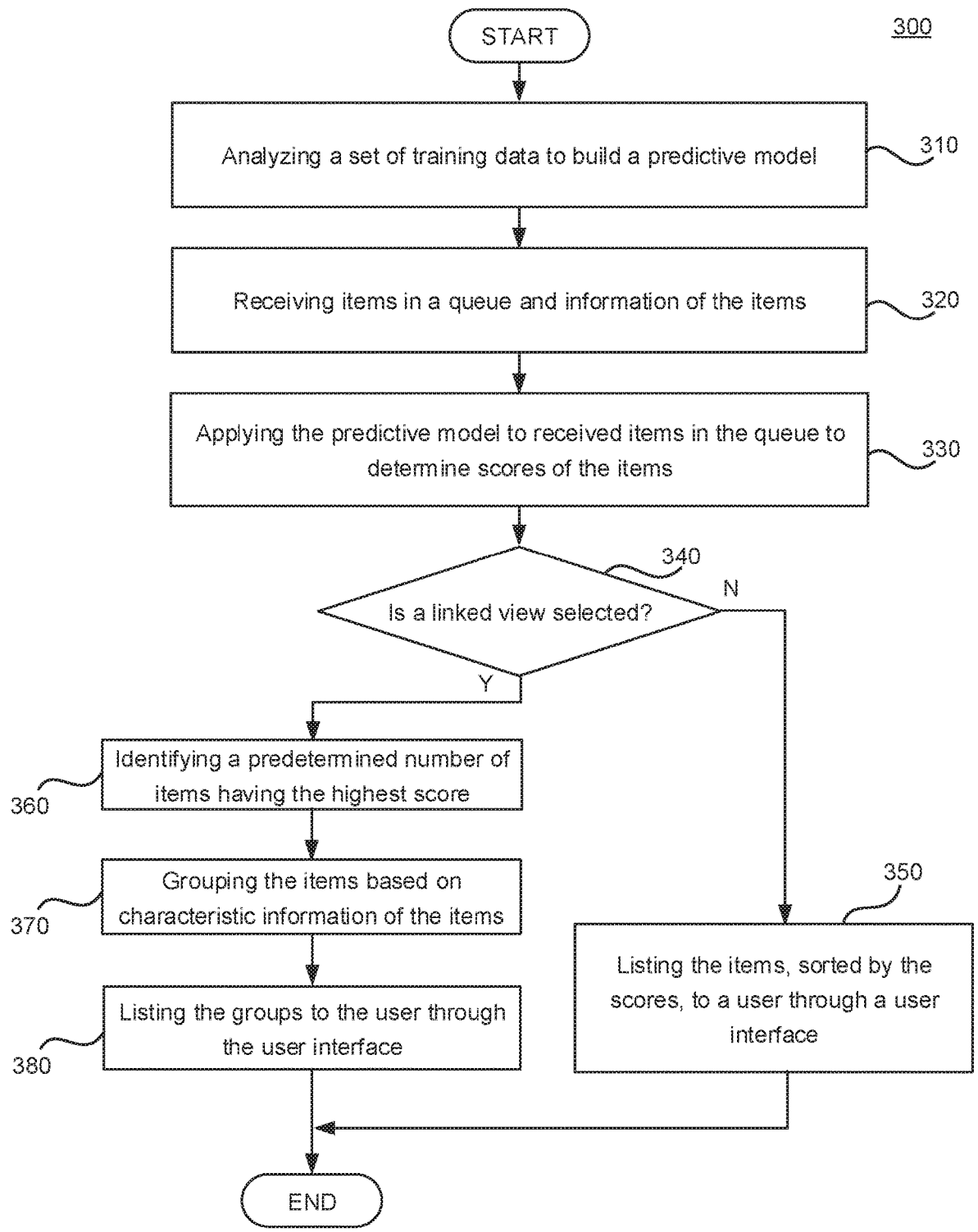
FIG. 3 is a flowchart of an exemplary method of processing items in the queue, consistent with some embodiments of the present disclosure.

For further understanding of operations of processor 122 in system 100, reference is made to FIG. 3, which is a flowchart of an exemplary method 300 of processing items in the queue, consistent with some embodiments of the present disclosure. In some embodiments, method 300 may be performed by system 100 depicted in FIG. 1 or cloud-computing system 200 in FIG. 2. For example, processor 122 can be configured to execute a set of instructions stored in memory device(s) 124. When the instructions are executed, processor 122 can perform operations disclosed in method 300. In the following description, reference is made to certain components of FIG. 1 for purposes of illustration. It should be appreciated, however, that other implementations are possible, including components other than those illustrated in FIG. 1. In some embodiments, method 300 may be performed by a Software as a Service (SaaS) platform, where the processing occurs on a server cloud (e.g., cloud-computing system 200 in FIG. 2).

In some embodiments, method 300 includes steps 310, 320, 330, 340, 350, 360, 370 and 380. At step 310, processor 122 is configured to analyze a set of training data to build a predictive model (e.g., predictive model 126 in FIG. 1) using one or more machine learning algorithms. As discussed above, predictive model 126 may be built by utilizing a machine-learning system (e.g., a gradient boosting machine) using the training data including snapshots of historical data obtained at different times. Each snapshot may be created according to rules described above and include historical loan applications previously pending in a working queue of a user (e.g., the relationship manager). In some embodiments, applications included in the snapshots have been either funded, expired or been rejected.

At step 320, processor 122 is configured to receive items (e.g., new loan applications) in a queue, and information of the items. Information of the items may include tasks or actions of the items, one or more parties corresponding to the items, and the like. In some embodiments, the financial entity may receive loan applications from different loan arranging entities (e.g., dealerships). Particularly, in some embodiments, the loan arranging entities may send the loan applications to one or more intermediaries, which may then distribute the loan applications to multiple financial institutions. The financial entity may record the received information in database(s) 160. Processor 122 may then obtain characteristic information of the loan applications pending in the queue, such as applicant's credit information, deal structure, dealer information, engagement information, other dynamic features, and the like. In some embodiments, some or all the information of the loan applications can be accessed or viewed by the responsible relationship manager(s) via user interface 144.

At step 330, processor 122 is configured to apply the trained predictive model (e.g., predictive model 126 in FIG. 1) to received items in the queue to determine scores of the items based on respective probabilities of an entity (e.g., the financial entity) completing the action or task for each item. In some embodiments, processor 122 may apply the trained predictive model to prioritize the items in the queue based on the determined scores of the items. As discussed above, in some embodiments, the score of each new loan application can be multiplied by a scalar provided for that loan application, adjusted based on certain characteristics (e.g., the expected profitability and the like) of that loan application, and/or divided by an average working time required for that loan application. The items can be sorted based on corresponding scores and then stored in an updated queue (e.g., working queue 128 in FIG. 1).

While step 330 may be carried out upon receiving a new application to determine the score of the new loan application, in some embodiments, step 330 may also be carried out when an existing application receives updated information. For example, if one loan application receives a co-signer, the score may be re-evaluated. Likewise, if the dealership responds to terms proposed by the relationship manager for one loan application, the score may be re-evaluated based on the response. Step 330 may also be carried out in other instances to evaluate or re-evaluate loan applications without departing from the spirit and scope of the present disclosure.

In some embodiments, step 330 may be carried out to re-evaluate loan applications throughout their lifecycle. In some embodiments, the age of the loan applications may be a dynamic feature taken into consideration by step 330, which may update the scores calculated for the loan applications as the loan applications progress through their lifecycle. In some embodiments, users (e.g., relationship managers) may also utilize a refresh button provided on user interface 144 to initiate the re-evaluation process.

In some embodiments, processor 122 may perform steps 340-360 to present the prediction results to one or more users (e.g., relationship managers), in different display views to help the user(s) to prioritize the actions or tasks. For example, a relationship manager may decide whether to proactively engage with the corresponding loan arranging entity for any of the loan applications, having pending actions, in his or her working queue 128. When the relationship manager interacts with user interface 144, items in working queue 128 can be presented and listed in a default view or a linked view to help the relationship manager to engage with different loan arranging entities listed in working queue 128.

Particularly, in some embodiments, at step 340, processor 122 is configured to determine whether a linked view is selected by the user. For example, the user can configure and switch between the default view or the linked view through user interface 144. For ease of understanding, the default view and the linked view will be discussed in detail below in conjunction with FIGS. 4 and 5.

If the linked view is not selected (340—no), at step 350, processor 122 is configured to list the items, sorted by the scores, in a first display view (e.g., the default view) to the user (e.g., a relationship manager) through user interface 144.

Figure 4:
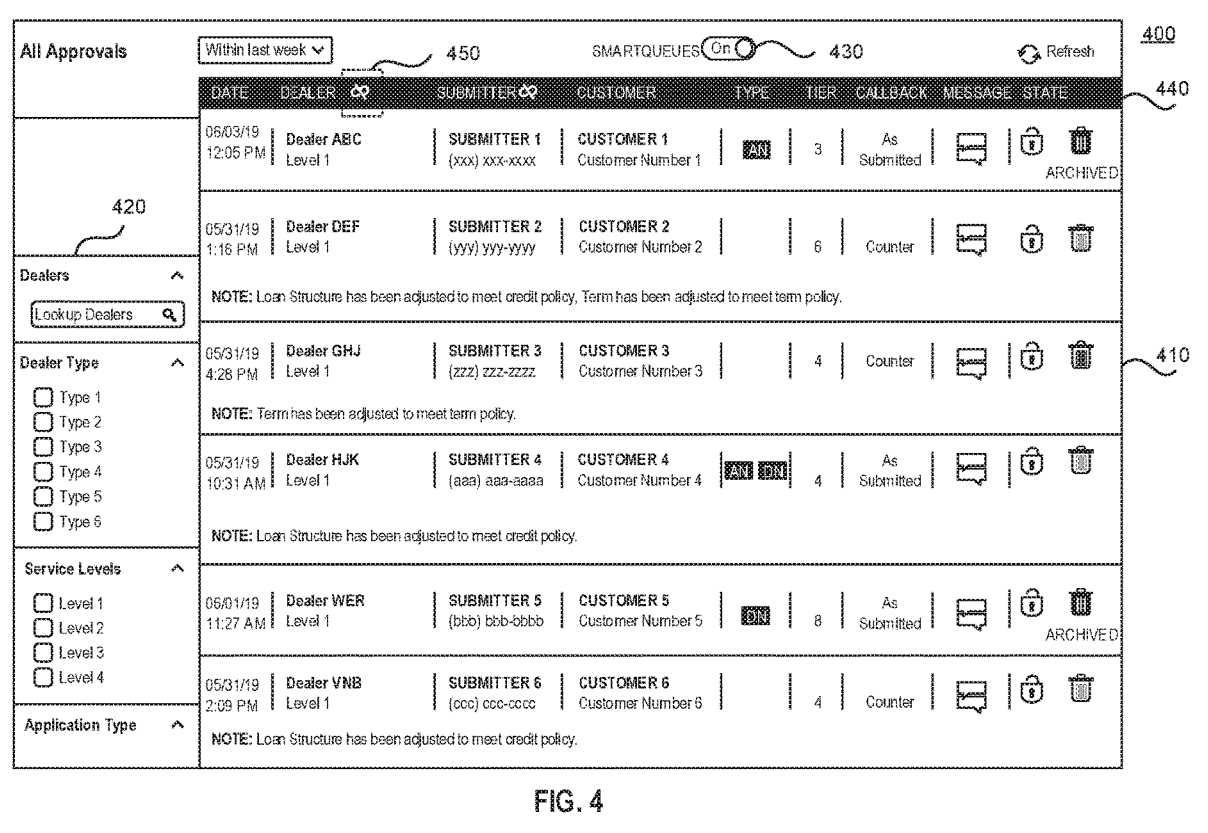

Reference is made to FIG. 4. FIG. 4 is a schematic diagram illustrating an exemplary user interface 400 in the first display view that may be utilized to present the loan applications to a relationship manager, consistent with some embodiments of the present disclosure. The relationship manager may utilize interface 400 to negotiate with the loan arranging entities (e.g., dealerships). As shown in FIG. 4, user interface 400 includes an application list 410, one or more data filters 420, a switch 430, types of data categories 440, and a button 450.

For each of the listed loan applications in application list 410, types of data categories 440 indicate columns for the time information of the latest update ("DATE"), the dealer's name and relevant information ("DEALER"), the submitter's name and his or her contact information ("SUBMITTER"), the customer's name and his or her reference number ("CUSTOMER"), the application type ("TYPE"), e.g., personal loans or commercial loans, the application tier ("TIER"), which may be determined based on the dollar amounts of the loans and the types of the loans, the counteroffer information ("CALLBACK"), the hyperlink directed to negotiation messages ("MESSAGE"), and whether the application is locked or archived ("STATE"). It is noted that while information such as the application tier may affect the score of the application in some embodiments, the application tier itself does not indicate the actual score determined by processor 122.

The listed loan applications, which are ranked and listed in application list 410 in a descending order according to the scores, may remain pending in the queue until they are funded, expired, rejected, cancelled, or otherwise acted upon by either the relationship manager or the dealership. The relationship manager may provide a response back to the dealership with proposed loan terms for one of the listed loan applications in application list 410 and wait for further communications from the dealership.

As shown in FIG. 4, processor 122 is configured to display respective loan arranging entities and submitters of the loan applications in user interface 400 in the default view. In some embodiments, the user may, for example, apply one or more data filters 420 made available through user interface 400. For example, the user may apply one or more data filters 420 to request display of only loan applications sent from a certain dealerships or intermediaries. In some embodiments, the user may have the option to turn off the ranking using switch 430 provided on user interface 400. The user may then choose to sort the loan applications using various types of data categories 440, such as date information, dealer information, submitter information, customer information, or tiers of the loans applications without departing from the spirit and scope of the present disclosure.

The user may send a command through user interface 400 to switch back and forth between the default view and the linked view. For example, the user may provide such command by clicking a button 450 provided on user interface 400. In various embodiments, other interactive means, including selecting lists, checkboxes, etc., can also be provided on user interface 400 to achieve the switching between different display views. In response to the command from the user through user interface 400, processor 122 is configured to switch user interface 400 from the default view to the linked view.

Referring to FIG. 3 again, if the linked view is selected (340—yes), then at step 360, processor 122 is configured to identify a predetermined number of items having the highest scores. For example, in some embodiments, processor 122 is configured to identify a first item having the highest score, and a second item having the next highest score. It is appreciated that the number of items to be identified may be different in various embodiments. For example, in some embodiments, processor 122 is further configured to identify a third item having a third highest score, and so on.

At step 370, processor 122 is configured to group other ones of the items that satisfy a grouping condition based on characteristic information of the items, with each of the identified items having high scores. For example, processor 122 can group with each of the first and second items, one or more corresponding items that satisfy the grouping condition.

In embodiments where the first and second items are first and second loan applications pending in the queue, the grouping condition may be the submitter information or the loan arranging entity information. In one embodiment, processor 122 can identify loan arranging entities of the loan applications. If one of the loan applications corresponds to the same loan arranging entity as that of the first loan application or the second loan application, processor 122 is configured to group it with the first loan application or the second loan applications. In another embodiment, processor 122 can identify submitters of the loan applications. If one of the loan applications corresponds to the same submitter as that of the first loan application or the second loan application, processor 122 is configured to group it with the first loan application or the second loan applications.

At step 380, processor 122 is configured to list the groups of items including the first and second items in the second display view (e.g., the linked view) to the user (e.g., the relationship manager) through user interface 144. The group including the first item, hereafter referred to a first group, and the group including the second item, hereafter referred to a second group, can be sorted based on the scores of the first item and the second item. For example, as the score of the first item is greater than the score of the second item, items in the first group can be listed at the top of the queue in user interface 144, and items in the second group can be listed below the first group in user interface 144.

In some embodiments, when listed in user interface 144, the items in the same group can also be sorted and presented based on their scores. For example, processor 122 can be configured to list multiple items in the same group in a descending order according to the scores of the items, so the item having the highest score in the group is listed as the top item in the group, and so on.

As discussed above, in some embodiments, processor 122 may identify three or more items having high scores. If a third item having a third highest score is identified, at step 370, processor 122 is further configured to group the items that satisfy the grouping condition based on the characteristic information with the third item. At step 380, processor 122 is further configured to list the group of the items including the third item in the second display view below the second group, to the user through user interface 144.

Figure 5:
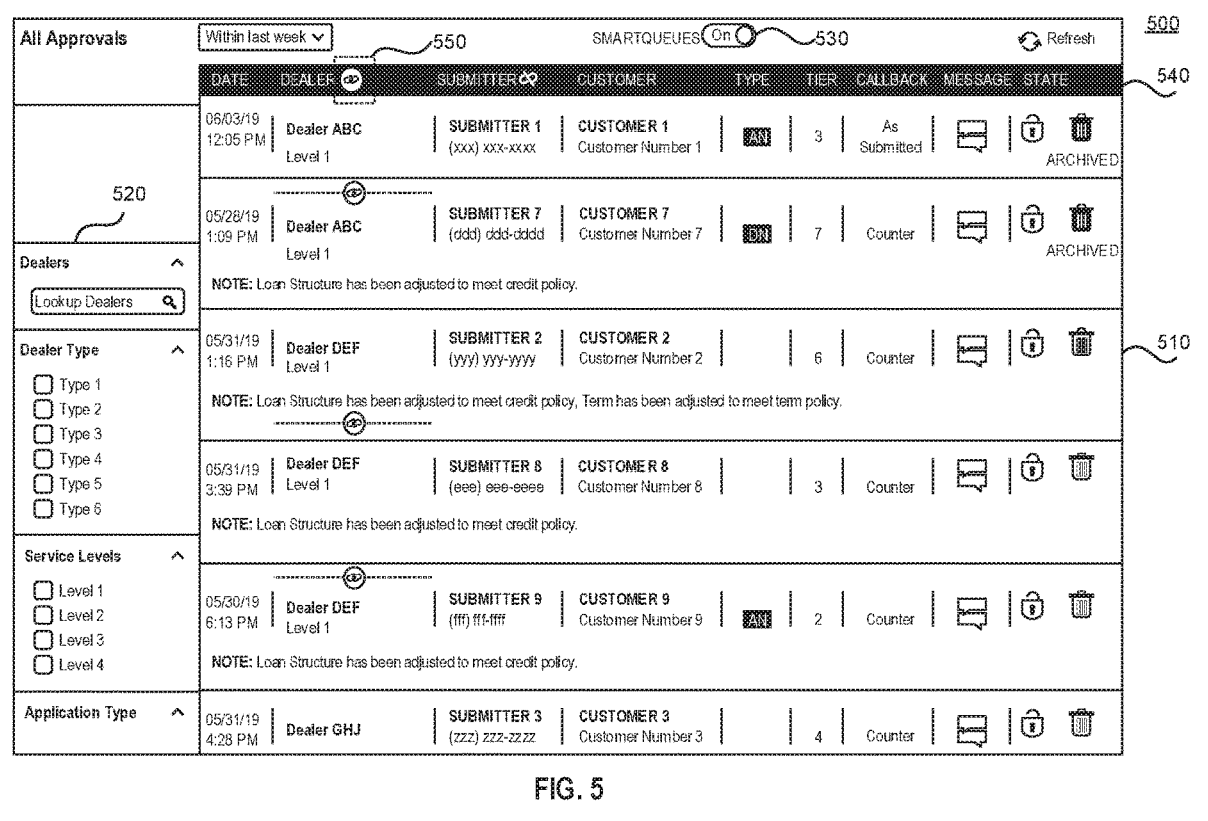

Reference is made to FIG. 5. FIG. 5 is a schematic diagram illustrating an exemplary user interface 500 in the second display view that may be utilized to present the loan applications to a relationship manager, consistent with the disclosed embodiments. Similar to user interface 400 in FIG. 4, as shown in FIG. 5, processor 122 is configured to display respective loan arranging entities and submitters of the loan applications in user interface 500 in the linked view. User interface 500 also provides an application list 510, one or more data filters 520, a switch 530, data categories 540 and button 550 for switching between different views. In FIG. 5, after pressed by the user, button 550 is highlighted, indicating that user interface 500 presents information in the linked view.

As shown in FIG. 5, two loan applications having the same "Dealer ABC" are grouped and displayed together with a linking chain mark showing that the two loan applications are "linked." Thus, when the relationship manager reaches out to the "Dealer ABC" to discuss the loan application having the highest score, the relationship manager can also discuss another loan application with the same dealer.

Similarly, three loan applications having the same "Dealer DEF" are grouped and displayed together with linking chain marks showing that the three loan applications are "linked." When the relationship manager reaches out to the "Dealer DEF" to discuss the loan application having the next highest score, the relationship manager can also discuss other loan applications with the same dealer. Thus, the linked view provided in user interface 500 can facilitate the engagement process with loan arranging entities and avoid repeated calls to the same dealer.

As shown in FIG. 5, in some embodiments, processor 122 may list items sorted by the scores in each of the groups in the second display view. For example, in the three loan applications having the same "Dealer DEF," the loan application for "CUSTOMER 2" has the highest score, the loan application for "CUSTOMER 8" has the second highest score, and the loan application for "CUSTOMER 9" has the third highest score. Accordingly, the three loan applications in the same group are ranked and sorted by the scores in the second display view. As noted above, the score itself is not included in the list.

In addition, in some embodiments, processor 122 may limit the number of the listed items in each of the groups to be within a threshold value. For example, while there may be more than three loan applications having the same "Dealer DEF," processor 122 may only present the top three loan applications in the group in the linked view. It is appreciated that the threshold value can be customized and adjusted in different embodiments based on need, and the embodiments discussed herein are merely examples and not meant to limit the scope of the present disclosure. In different embodiments, processor 122 may present 2, 3, 4, 5, or any possible number of listed items in each group. In some embodiments, different groups may also apply different threshold values.

It is also appreciated that different grouping conditions can be set in various embodiments. For example, in some embodiments, loan applications having the same submitter are grouped and displayed together with a linking chain mark showing that the loan applications are "linked." Grouping conditions based on different types of characteristic of the items may be configured by the user through user interface 400 or 500. The grouping conditions discussed above and illustrated in FIG. 5 are merely examples and not meant to limit the scope of the present disclosure.

Similar to the operations discussed above, the user may provide a command by clicking button 550 provided on user interface 500 to achieve the switching between different display views. In response to the command from the user through user interface 500, processor 122 is configured to switch user interface 500 from the linked view back to the default view.

It is noted that while the calculated scores are only applied in the background for ranking and not shown in user interfaces 400 and 500 in FIG. 4 or FIG. 5, the embodiments discussed above are merely examples and not meant to limit the scope of the present disclosure. In some embodiments, the calculated score for each application may be displayed in user interfaces 400 and 500 to provide more information for assisting the relationship manager.

Accordingly, by performing method 300 described above, system 100 or cloud-computing system 200 can process multiple items in the queue to rank items, and group items to be presented to the user in response to commands from the user. In view of the above, systems and methods for processing items in a queue disclosed in various embodiments of the present disclosure provide multiple display views to list items in different ways to satisfy the needs in different scenarios. By switching the display views, the disclosed systems and methods can provide a more flexible user interface to help the user prioritize and complete tasks or actions of the items and improve the efficiency of managing items associated with different external parties in the working queue.

The various example embodiments herein are described in the general context of systems, method steps, or processes, which may be implemented in one aspect by a computer program, an application, a plug-in module or subcomponent of another application, or a computer program product which is embodied in a transitory or a non-transitory computer-readable medium, including computer-executable instructions, such as program code, executed by computers in networked environments. A computer-readable medium may include removable and nonremovable storage device(s) including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequences of such executable instructions or associated data structures represent examples of corresponding acts for implementing the functions described in such steps or processes.

As used herein, unless specifically stated otherwise, the term "or" encompasses all possible combinations, except where infeasible. For example, if it is stated that a database may include A or B, then, unless specifically stated otherwise or infeasible, the database may include A, or B, or A and B. As a second example, if it is stated that a database may include A, B, or C, then, unless specifically stated otherwise or infeasible, the database may include A, or B, or C, or A and B, or A and C, or B and C, or A and B and C.

In the foregoing drawings and specification, embodiments have been described with reference to numerous specific details that can vary from implementation to implementation. It will be apparent to those skilled in the art that various adaptations and modifications of the described embodiments can be made. Other embodiments will be apparent to those skilled in the art from consideration of the specification and practice of systems and related methods disclosed herein. It is intended that the sequence of steps shown in figures are only for illustrative purposes and are not intended to be limited to any particular sequence of steps. As such, those skilled in the art can appreciate that these steps can be performed in a different order while implementing the same or similar methods. It is intended that the specification and examples be considered as exemplary only, with a true scope being indicated by the following claims and their equivalents.

What is claimed is:

1. A system for processing items in a queue, comprising:
   one or more databases including training data stored therein;
   one or more memory devices storing instructions;
   one or more processors configured to execute the instructions;
   one or more interfaces that manage interactions between the one or more processors and the one or more databases; and
   the one or more processors configured to execute the instructions to perform operations comprising:
   analyzing the training data stored in the one or more databases and building a predictive model based on the analyzing of the training data, wherein:
      the analyzing of the training data includes building the predictive model utilizing a machine-learning system trained using the training data, and
      the machine-learning system comprises a gradient boosting machine configured to produce the predictive model as an ensemble of predictive models for predicting the probabilities of a loan arranging entity funding the plurality of loan applications without proactive engagement of a user working for a loan arranging entity completing an action;
   applying the predictive model to a plurality of items in a queue and determining scores of the plurality of items based on respective probabilities of an entity completing the action for each of the plurality of items;
   generating a first display view to a user on a user interface of the one or more interfaces, the first display view listing the plurality of items that are sorted by the scores;
   identifying a first and a second item, of the plurality of items, respectively having highest and next highest scores; and
   grouping, with each of the first and second items, other ones of the plurality of items that satisfy a grouping condition based on characteristic information of the plurality of items.

2. The system of claim 1, the operations further comprising switching between the first display view and a second display view on the user interface of the one or more interfaces in response to a command from the user through the user interface.

3. The system of claim 1, the operations further comprising listing the plurality of items that are sorted by the scores in a descending order of the scores in the first display view.

4. The system of claim 1, the operations further comprising displaying the scores of the plurality of items in the user interface in the first display view or in a second display view on the user interface of the one or more interfaces.

5. The system of claim 1, the operations further comprising:
   identifying a third item, of the plurality of items, having a third highest score;
   grouping, with the third item, other ones of the plurality of items that satisfy the grouping condition based on the characteristic information; and
   listing the group of the plurality of items including the third item in a second display view on the user interface of the one or more interfaces.

6. The system of claim 1, the operations further comprising listing, in each of the groups, the ones of the items sorted by the scores in a descending order of the scores, in a second display view on the user interface of the one or more interfaces.

7. The system of claim 1, wherein the gradient boosting machine is configured to produce the predictive model as an ensemble of predictive models which include decision trees for predicting the probabilities of the loan arranging entity funding the plurality of loan applications without proactive engagement of a user working for the loan arranging entity completing the action.

8. The system of claim 1, the operations further comprising displaying, in each of the groups, the ones of the items sorted by the scores in a second display view on the user interface of the one or more interfaces with a linking chain mark showing that the ones of the items are linked.

9. The system of claim 1, the operations further comprising:
   generating a second display view to the user on the user interface of the one or more interfaces, the second display view listing the groups of items including the first and second items that are sorted based on the scores of the first and second items;
   listing, in each of the groups, ones of the items sorted by the scores, in the second display view; and
   limiting the number of the listed items in each of the groups to be within a threshold value.

10. A method for processing items in a queue, comprising:
    receiving characteristic information of a plurality of items;
    building a predictive model utilizing a machine-learning system, wherein the machine-learning system comprises a gradient boosting machine configured to produce the predictive model as an ensemble of predictive models for predicting the probabilities of a loan arranging entity funding the plurality of loan applications without proactive engagement of a user working for a loan arranging entity completing an action;

applying the predictive model to the plurality of items and determining scores of the plurality of items based on respective probabilities of an entity completing the action for each of the plurality of items;

generating a first display view to a user on a user interface of one or more interfaces, the first display view listing the plurality of items that are sorted by the scores;

identifying a first and a second item, of the plurality of items, respectively having highest and next highest scores; and grouping, with each of the first and second items, other ones of the plurality of items that satisfy a grouping condition based on characteristic information of the plurality of items.

11. The method of claim 10, further comprising switching between the first display view and a second display view on the user interface of the one or more interfaces in response to a command from the user through the user interface.

12. The method of claim 10, further comprising listing the plurality of items that are sorted by the scores in a descending order of the scores in the first display view.

13. The method of claim 10, further comprising training the machine-learning system using the characteristic data.

14. The method of claim 10, wherein the listing the groups further comprises:
   identifying a third item, of the plurality of items, having a third highest score;
   grouping, with the third item, other ones of the plurality of items that satisfy the grouping condition based on the characteristic information; and
   listing the group of the plurality of items including the third item a second display view on the user interface of the one or more interfaces.

15. The method of claim 10, further comprising listing, in each of the groups, the ones of the items sorted by the scores in a descending order of the scores, in a second display view on the user interface of the one or more interfaces.

16. The method of claim 10, further comprising listing the plurality of items that are sorted by the scores in a descending order of the scores in the first display view.

17. The method of claim 10, further comprising displaying, in each of the groups, the ones of the items sorted by the scores in a second display view on the user interface of the one or more interfaces with a linking chain mark showing that the ones of the items are linked.

18. A non-transitory computer-readable medium storing instructions that are executable by one or more processors to perform operations comprising:
   building a predictive model utilizing a machine-learning system trained using the respective probabilities of an entity completing an action for each of a plurality of items, wherein the machine-learning system comprises a gradient boosting machine configured to produce the predictive model as an ensemble of predictive models for predicting the probabilities of a loan arranging entity funding the plurality of loan applications without proactive engagement of a user working for a loan arranging entity completing the action;
   applying the predictive model to a plurality of items in a queue of items and determining scores of the plurality of items based on the respective probabilities of the entity completing the action for each of the plurality of items;
   generating a first display view to a user on a user interface of one or more interfaces, the first display view listing the plurality of items that are sorted by the scores;
   identifying a first and a second item of the plurality of items respectively having highest and next highest scores; and
   grouping, with each of the first and second items, other ones of the plurality of items that satisfy a grouping condition based on characteristic information of the plurality of items.

19. The non-transitory computer-readable medium of claim 18, wherein the ensemble of predictive models includes decision trees.

20. The non-transitory computer-readable medium of claim 18, wherein the loan arranging entity comprises an automobile dealership.

* * * * *